May 24, 1966  E. F. FELDMAN  3,253,216
FREQUENCY RESPONSE TESTING SYSTEM EMPLOYING PRE-CALIBRATED
FREQUENCY SWEEPS
Filed Sept. 25, 1962  2 Sheets-Sheet 1

INVENTOR
EDWARD F. FELDMAN
BY *Hurwitz & Rose*
ATTORNEYS

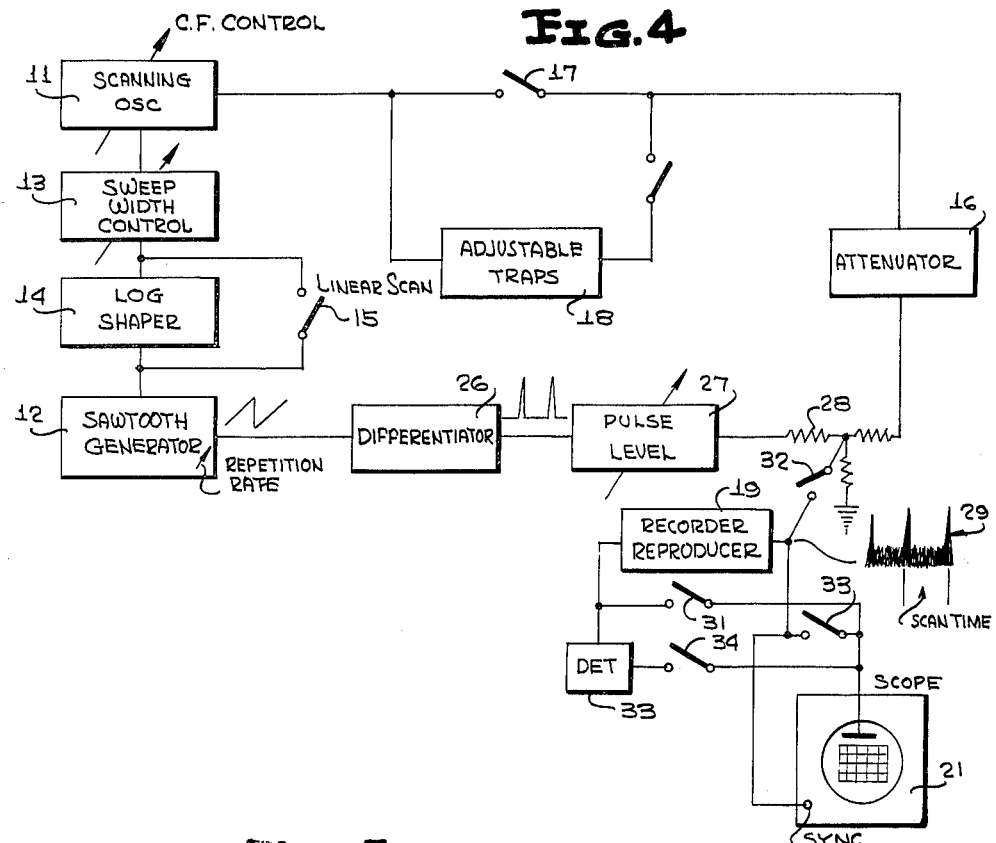
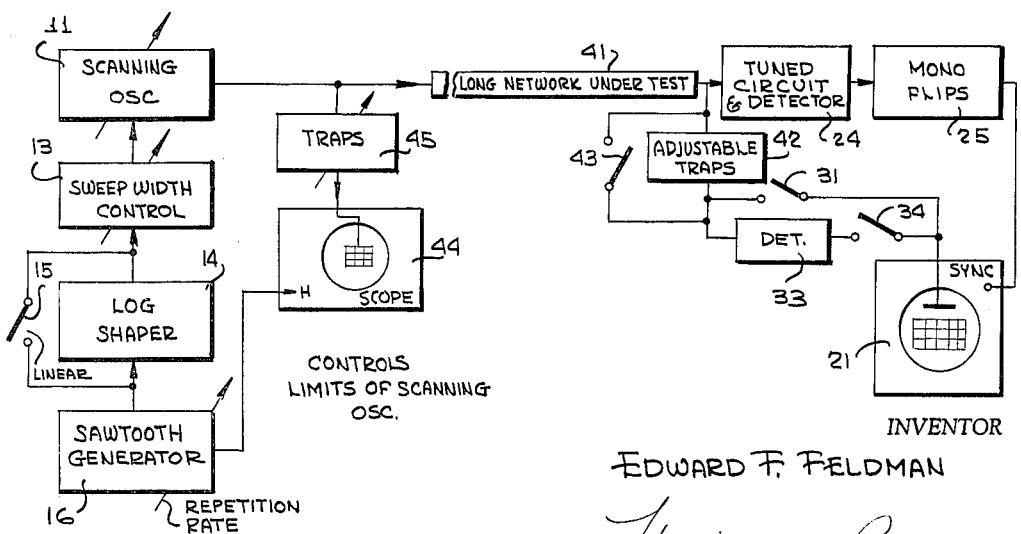

United States Patent Office 3,253,216
Patented May 24, 1966

3,253,216
FREQUENCY RESPONSE TESTING SYSTEM EMPLOYING PRE-CALIBRATED FREQUENCY SWEEPS
Edward F. Feldman, New Rochelle, N.Y., assignor, by mesne assignments, to The Singer Manufacturing Company, New York, N.Y., a corporation of New Jersey
Filed Sept. 25, 1962, Ser. No. 225,980
16 Claims. (Cl. 324—57)

The present invention relates generally to test equipments, and more particularly to systems for testing the frequency response characteristics of electrical equipments, such as magnetic tape recorders and reproducers, and communications networks, e.g., long transmission links.

It is known to provide a frequency scanning signal of level amplitude, for recording in and subsequent reproduction from a magnetic tape recorder and reproducer. The amplitude of the reproduced signal is plotted as a function of frequency, deviations from level value being caused by and representative of non-linearities of frequency response characteristics of the recorder-reproducer equipment. Such systems require a solution of the problem of providing frequency markers, in the plot, so that it may be known precisely for which frequency or frequencies non-linearities occur. This problem has been solved in the past by superimposing on the recorded frequency scanning signal a plurality of markers, which can be distinguishably detected, and utilized to provide visual markers on the plot. A typical example of such a system is disclosed in the U.S. patent to Johnson #2,588,730.

In accordance with the present invention the frequency scanning signal which is applied to a magnetic tape recorder and reproducer, for testing its frequency response characteristics, is unencumbered with any extraneous frequencies during the significant portion of the frequency scan. The cathode ray tube on which the amplitude of the reproduced scan is displayed as a function of frequency is provided with a calibrated separable overlay scale. The markers are used during calibration checks of the frequency scanning signal and are derived from filters, such as frequency traps. Assuming that the precise frequencies of the traps are known, the calibrated display is utilized to provide information with respect to the frequencies of the frequency scanning signal excursion and this information may be utilized to make minor adjustments in the scan to conform to the calibrated scale. Once this has been accomplished, successive tests on a given recorder-reproducer, or plural recorder-reproducers, may be tested entirely by reference to the calibrated scale.

The recited procedure provides the basic advantage that the display frequency response characteristics of the recorder-reproducer under test is not modified by marker information and vice versa.

Where marker pulses are superposed on the testing signal, the characteristics of the device under test may affect the accuracy of the markers. Where there are sharp variations of response with frequency, the build up and decay times become of consequence. The shorter, and more accurate the marker, the more will its response be altered. Superposed markers tend to mask characteristics of the device being tested. Further, where the sweep is variable in extent and repetition rate, it is desirable to have variable markers. Superposed markers are especially undesirable where the response of the tested device has narrow band peaks or valleys since the marker tends to obscure the curve.

Further, it is often desirable to detect the output of the reproducer before plotting so as to obtain a single line trace. The detector time constant must be large enough to filter out the lowest audio signals of interest. However, a large time constant in the detector precludes the use of fast pulses as markers. Unless the marker pulses are fast, on the other hand, they become inaccurate.

There are, therefore, many reasons for avoiding the use of marker pulses over the range of a frequency scanned signal, in superposition of the signal. The system of the present invention permits such avoidance, while permitting complete flexibility of sweep range, sweep rate, character of display, design of amplifiers, detectors and the like, involved in the system, and in all respects renders the test results independent of extraneous influences.

An additional feature of the present invention resides in the provision of a notch or trap filter which is responsive to a predetermined frequency derived from the test equipment to trigger the CRT horizontal saw tooth deflection voltage. This arrangement is advantageous since it does not require high frequency pulses to be transmitted to the equipment under test. If the equipment being tested is a delay line or other device having a low cut off frequency, a pulse may be sufficiently attenuated to be rendered unrecognizable.

It is, accordingly, a broad object of the present invention to provide a new and improved system for testing the frequency response of an electrical equipment by utilizing a frequency scanning signal that is accurately calibrated.

It is a further object of the present invention to provide a system for testing frequency response of an electrical system to a frequency scanning signal, wherein frequency calibration is provided in the form of comparison markers, without modification of the frequency scanning signal in order to provide the markers.

Another object of the invention resides in the provision of a system for testing frequency response to a scanning signal, wherein the response is compared with markers on a pre-calibrated mask, the scanning frequencies being adjusted to fit the mask by applying it through filters which derive null outputs for the calibration frequencies.

Another object of the present invention is to provide a system employing an oscilloscope for determining the frequency response of electric equipment wherein the horizontal sweep signal of the oscilloscope is triggered by a predetermined frequency in the test spectra.

The above and still further objects, features and advantages of the present invention will become apparent upon consideration of the following detailed description of one specific embodiment thereof, especially when taken in conjunction with the accompanying drawings, wherein:

FIGURE 4 is a block diagram of another embodiment of the present invention; and

FIGURE 5 is a block diagram of still another embodiment of the present invention.

Figure 1:
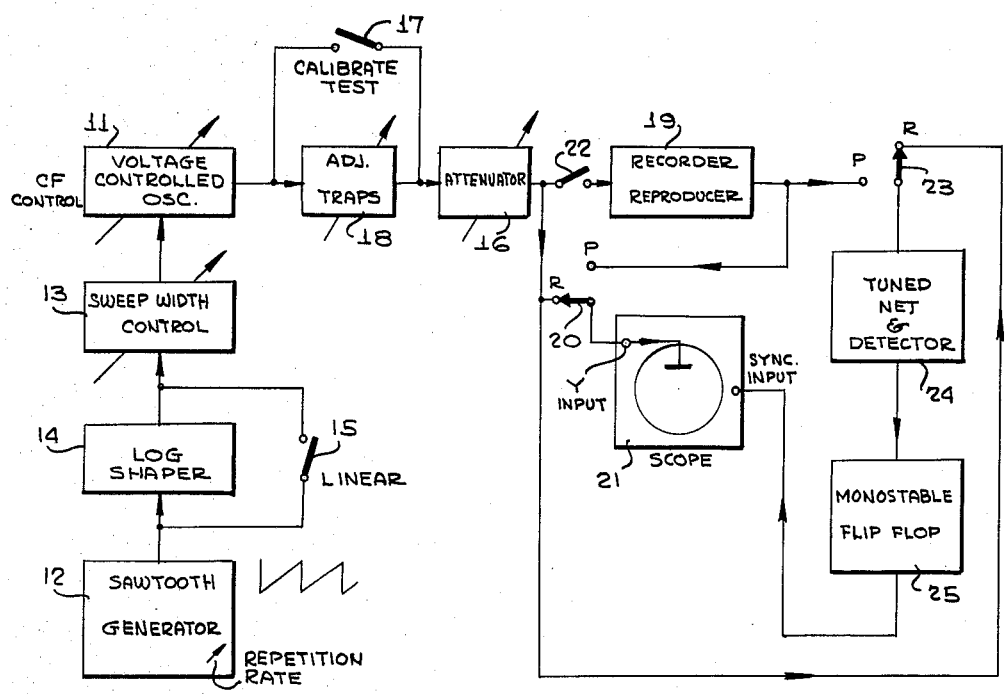
FIGURE 1 is a block diagram of a preferred embodiment of the present invention.

Reference is now made to FIGURE 1 of the accompanying drawings which discloses a repetitively scanning or swept voltage controlled oscillator 11 which generates continuously varying frequencies in the range of the equipment to be tested, e.g., 20 cycles to 20 kc. or selected segments within the overall range. The extent of the scan excursions generated by oscillator 11 is controlled by sawtooth generator 12 which is coupled to sweep width (sawtooth amplitude) control 13 via either log shaping circuit 14 or switch 15. The repetition rate of sawtooth generator 12 is variable to control the period of a complete sweep of oscillator 11.

If it is desired for oscillator 11 to have a logarithmic frequency variation as time progresses, switch 15 is open and the linear sawtooth wave derived from generator 12 is modified in a logarithmic manner by shaper 14. For a linear frequency versus time variation of oscillator 11, switch 15 is closed so that the linear amplitude versus time variations of generator 12 are passed unmodified in shape to the oscillator. To facilitate synchronization on the external indicator, an output frequency excursion direction from high to low, or from right to left in time along the CRT frequency axes is preferred.

To control the upper and lower frequency variations of oscillator 11, sweep width control 13 includes an attenuator for controlling the maximum and minimum voltages applied to the oscillator. The center or natural frequency of oscillator 11, which may be of the standard reactance tube type, is varied by a known tuning arrangement. Thereby, the maximum, minimum, and center frequencies derived from oscillator 11 are selectively controlled by the oscillator tuned circuit and sweep width control 13.

The output of oscillator 11 is applied to attenuator 16 via either switch 17 or a plurality of parallel adjustable traps or notch filters 18. With switch 17 open, the output of oscillator 11 passes through the adjustable traps to the attenuator. The traps 18 are adjusted to provide null outputs at predetermined selected frequencies of oscillator 11. With the system in a logarithmic frequency variation condition, the traps are arranged to have null outputs at frequencies of 20 cycles per second, 1 kc., and 20 kc., assuming an oscillator excursion having a calibrated frequency range of 20 cycles to 20 kc., plus some sweep beyond the calibrated limits.

Once oscillator 11 has been calibrated in a manner described infra, switch 17 is closed and the oscillator output is passed unaltered to attenuator 16. Attenuator 16 is provided to control the amplitude of the signal applied by oscillator 11 to recorder-reproducer 19 or the vertical deflection amplifier of oscilloscope 21.

With the system in a calibrate condition, switch 22, connected between the recorder input and the output of attenuator 16, is open. With the system in a recording or calibrating state, the output of attenuator 16, in addition to being applied to the vertical deflection amplifier of oscilloscope 21, is applied via switch 23 to tuned network and detector 24.

When a preselected frequency, preferably near the upper frequency excursion of oscillator 11 occurs, a peak level is obtained at the output of detector 24 which includes a highly selective resonant tuned network and a detector to actuate monostable flip-flop 25, connected in cascade with network 24. When a peak output is derived from network 24, flip-flop 25 is energized to produce a well-defined rectangular pulse of predetermined level and duration. This pulse is used to trigger, on a one for one frequency basis, the linear time base ($x$ axis) sawtooth generator commonly found in modern cathode ray oscilloscopes. The trace length is adjusted by the appropriate scope controls to encompass the prescribed width shown on a calibrated CRT overlay.

Since the oscilloscope's sawtooth generator and the sawtooth generator 12 are both linear and operated in synchronism, the calibration across the face of oscilloscope 21 is directly related to the frequencies of oscillator 11. In the alternative, the leading edge of the signal derived from flip-flop 25 is utilized as a trigger source to activate sawtooth generator which can drive the $x$ axis deflection amplifier of oscilloscope 21. Either method is equivalent in establishing a meaningful frequency calibration.

With the system adjusted to calibrate oscillator 11, switch 17 is open so that predetermined nulls in the output are periodically traced on oscilloscope 21. Also, switch 22 is open to prevent the application of an input signal to recorder-reproducer 19. To provide indications of frequency response, the face of oscilloscope 21 has superimposed thereon a mask of frequency versus amplitude, frequency being the abscissa and amplitude the ordinate of a rectangular coordinate system, as shown in FIGURE 2, which illustrates the log scan mode only of the invention.

Figure 2:
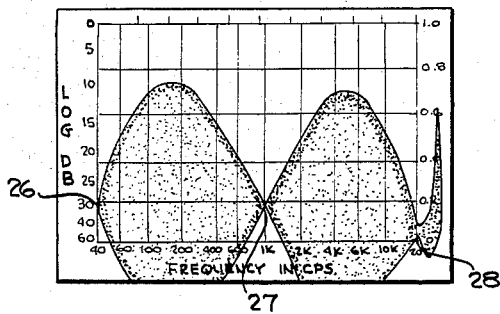
FIGURE 2 is an oscilloscope trace when the system of FIGURE 1 is in a "calibrate" state.

When the frequency of oscillator 11 coincides with the resonant frequency of the highest notch filter included in traps 18, 20 kc., a null voltage is applied to oscilloscope 21, resulting in null point 28 on FIGURE 2. As the frequency of oscillator 11 varies from 20 kc. to 1 kc., the output of attenuator 16 reaches a maximum and then achieves another null at the second notch filter resonant frequency, 1 kc., null point 27. When the lowest frequency of oscillator 11, 20 cycles, is achieved, the lowest notch filter resonant frequency is reached and another null 26 occurs on the oscilloscope trace.

With the aid of the horizontal coordinate designations on the face of the oscilloscope, the correctness of the output of oscillator 11 is obtained. If it is noted that notch 27 does not fall on the prescribed 1 kc. calibration mark, the oscillator 11 is adjusted until a null occurs at the 1 kc. center frequency. For minor inaccuracies in the low and high frequencies of the oscillator, appropriate adjustments are made in the parameters of log shaping network 14 and/or sweep width control 13, according to the operating procedures until the nulls are correctly located on the face of the scope.

Once oscillator 11 has been calibrated, testing of recorder-reproducer 19 is made possible by closing switches 17 and 22. Recorder-reproducer 19, which may be of any suitable type, e.g., magnetic tape, disk, wire, is then rendered responsive to the constant amplitude output of oscillator 11 over the complete scanning frequency range. A test record of any desired duration is thus made. Simultaneously with the application of the swept oscillator signal to recorder-reproducer 19, the oscillator output may also be applied to the vertical axis of oscilloscope 21. The horizontal deflection plates of oscilloscope 21 are synchronously driven by the sawtooth wave triggered by flip-flop 25. This is done for general monitoring and to insure a correct amplitude vs. frequency variation of the oscilloscope 21 over the frequency range of interest while the test record is being conducted. After a suitable number of oscilloscope traces has been applied to recorder-reproducer 19, the system is adjusted to the playback test state by opening switch 22 and positioning switches 20 and 23 so that their armatures are responsive to the output of the recorder-reproducer.

Figure 3:
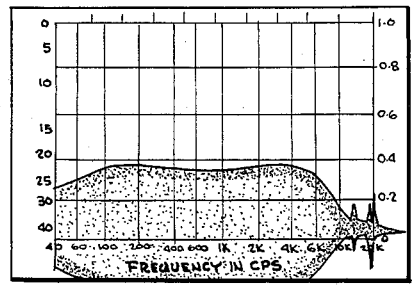
FIGURE 3 is an oscilloscope trace typical of results obtained when the system of FIGURE 1 is used to test recorder reproducers; wherein the trace is made in a "play back" state.

The test record on recorder-reproducer 19 is now repositioned to the same location that it occupied during the first application of the oscillator or test signal to it and is activated to play back the recorded signal. The playback signal is coupled to the vertical axis amplifier of oscilloscope 21 via switch 20 and triggers the horizontal scan of oscilloscope 21 since the frequency necessary to trigger monostable flip-flop 25 is recorded on recorder-reproducer 19. This results in a display on scope 21 as shown in FIGURE 3. Since oscilloscope 21 has been previously calibrated, the horizontal trace deflection of the CRT display provides an accurate indication of frequency while the vertical deflection provides a measure of the output amplitude at each frequency of interest. From the display of FIGURE 3, it is noted that the tested network has a flat midband response and a relatively good response down to the low end of the tested band but that cutoff in the high frequency range occurred well below the upper sweep limit.

Reference is now made to FIGURE 4 of the drawings which discloses a modification of the system shown in FIGURE 1. In the system of FIGURE 4 the circuitry for controlling scanning oscillator 11 and for calibrating the oscillator is substantially the same as in the system of FIGURE 1. The output of scanning oscillator 11 is coupled via variable attenuator 16 to the vertical deflection plates of oscilloscope 21 and the recorder-reproducer 19 being tested.

To synchronize the sweep voltage of oscilloscope 21 with the frequencies applied to the recorder-reproducer 19 being tested, a pulse due to the rapid flyback at the trailing edge of the sawtooth generator output is obtained by including differentiator 26 and connecting it to the sawtooth output. The spikes at the output of differentiator 26 are combined with the output of the scanning oscillator in linear combining network 28. The output of network 28 is applied to recorder-reproducer 19 via closed switch 32.

The output of recorder-reproducer 19, waveform 29, is applied via switch 31 to the vertical deflection amplifier of oscilloscope 21 when the system is in a test playback state. With the system in this state, the recorder is not applied with an input from the combining network 28 due to switch 32 being open. The pulses recorded on recorder 19 in response to the trailing edge of the sawtooth generator, do not appear as spikes on the trace observed on the screen of oscilloscope 21 because they occur only at the beginning of the oscilloscope sweep. Thereby, confusing frequency markers superimposed on the trace under observation are not obtained since the pulses are utilized only to activate the horizontal sawtooth deflection voltage of oscilloscope 21. The synchronizing pulses are of sufficient amplitude (exceeding peak value of the A.C. envelope) so that the oscillator output fed to the sync terminal has no effect on the sweep operation. In practice, this merely requires setting the threshold level of the scope sweep circuit above peak A.C. but below pulse peak.

If the recorder-reproducer being tested has poor frequency response the pulse waveform derived from differentiator 26, is distorted upon playback of the recorder-reproducer, thus degrading synchronization of the scope sawtooth generator. A tuned network such as circuit 24 of FIGURE 1 can be used to synthesize a suitable sync pulse upon playback. Thus, the recorder-reproducer 19 is capable of being tested once the test record has been recorded thereon without the need for connections to combiner 28, oscillator 11 or sawtooth generator 12.

If it is desired to provide a single line, rather than a sinusoidal trace of the recorder-reproducer 19 output, detector 33 is connected in the circuit to apply a detected input to the vertical amplifier of oscilloscope 21 by closing switch 34.

With the detector in the circuit, it is generally necessary to provide the sync pulse input to the horizontal sweep circuitry of oscilloscope 21 directly from the output of recorder-reproducer 19 or during setup and calibration from the output of combiner circuit 28. This is because the detector may sufficiently degrade the high frequency components of the spikes to render them undistinguishable from the recorder swept audio output. To apply the pulses to the sync terminal of scope 21 during plaback, switches 31 and 33 are closed and switch 32 is opened. In the setup and calibrate position, switch 32 is closed and the output of combining circuit 28 is directly applied to the sync input terminal of scope 21.

Reference is now made to FIGURE 5 of the drawings which discloses another modification of the present system designed specifically for testing any type of four terminal network, for example long transmission line 41. Transmission line 41 is responsive to the output of scanning oscillator 11 and couples its output signal to the vertical input of oscilloscope 21 via adjustable traps 42 or switch 43. Switch 43 is open during calibration of scanning oscillator 11 so that traces such as shown in FIGURE 2 are observed on oscilloscope 21. Calibration is effected by controlling the scanning oscillator center frequency and its upper and lower excursions by sweep width control 13.

If the system is a long transmission line wherein the input and output terminals are remote from each other or in which considerable signal degradation occurs, an additional oscilloscope 44 is connected so that its vertical deflection plates are responsive to the output of scanning oscillator 11 after it has been applied through the parallel notch filters included in adjustable trap network 45. The filters in network 45 have identical characteristics as those in trap network 18. The horizontal sweep deflection of oscilloscope 44 is directly responsive to the output frequency of sawtooth oscillator 16 for synchronism between the output frequency and the horizontal deflection. Oscilloscope 44 thus monitors the calibration of oscillator 11 in substantially the same manner as oscilloscope 21, FIGURES 1 and 4.

To control the horizontal deflection of oscilloscope 21, FIGURE 5, tuned circuit and detector 24 is connected to the output of line 41 and feels monostable flip-flop 25 with a peak signal when a frequency at the upper end of the range is coupled through the transmission line. This controls the sync circuit so that a particular horizontal position on the display of oscilloscope 21 corresponds with the frequency applied to the vertical deflection plates thereof. The signal applied to the vertical deflection plates may be applied directly through switch 31 or via detector 33 as in the embodiment illustrated in FIGURE 4.

While I have described and illustrated one specific embodiment of my invention, it will be clear that variations of the details of construction may be resorted to without departing from the true spirit and scope of the invention as defined in the appended claims.

I claim:

1. A system for testing the frequency response of an equipment comprising:
   a display having an orthogonal coordinate system of frequency versus signal amplitude,
   a variable frequency generator of constant amplitude oscillations,
   means for periodically sweeping the frequency of said generator and the frequency coordinate of said display in synchronism,
   means for selectively calibrating the frequency of said generator including,
      means for coupling said oscillations to the ampli-amplitude coordinate of said display,
      said last named means including filter means for for providing a null input to the amplitude coordinate at a predetermined frequency of the oscillations,
      and means for at will varying the frequency of said oscillator to said predetermined frequency,
   means for selectively coupling the constant amplitude oscillations to said equipment,
   and means for selectively coupling an output from said equipment to the amplitude coordinate of said display.

2. The system of claim 1 including means for selectively coupling the output of said equipment to trigger the frequency coordinate sweep of said display.

3. The system of claim 2 wherein said equipment is a recorder, and means for selectively coupling the output of said recorder to said display only subsequent to recording of the oscillation of the oscillator.

4. The system of claim 1 wherein said means for sweeping includes a sawtooth generator coupled to vary the frequency of said oscillator, means for generating a pulse in response to a sudden change in the sawtooth generator output, and means for triggering the frequency coordinate sweep in response to said pulse.

5. The system of claim 1 wherein said means for sweeping the frequency coordinate of said display includes sweep trigger means responsive to a selected frequency of said generator.

6. The system of claim 1 including detector means responsive to the output of said equipment for providing a line amplitude response on said display.

7. The system of claim 1 including means for varying the frequency of said oscillations as a logarithmic function of time.

8. The system of claim 1 including means for varying the frequency of said oscillations as a linear function of time.

9. A system for determining the frequency response of a long four terminal network comprising first and second displays each having an orthogonal coordinate system of frequency versus signal amplitude, a variable frequency generator of constant amplitude oscillations coupled to the amplitude coordinate of said first display and to one end of said network, means coupled only between the amplitude coordinate of said first display and said generator for providing a null input to the amplitude coordinate of said first display at a predetermined frequency of said oscillations, means for periodically sweeping the frequency of said oscillator and the frequency coordinate of said first display in synchronism, means for coupling the signal at the other end of said network to the amplitude coordinate of said second display, and means responsive to a predetermined frequency of the signal derived at the other end of said network for sweeping the frequency coordinate of said second display in synchronism with the frequency variation of the signal at the other end of said network.

10. A system for testing the frequency response of equipment comprising a variable frequency oscillator, means responsive to said oscillator for coupling a frequency varying signal of constant amplitude to said equipment, wherein a signal of random amplitude is derived from said equipment, means for deriving calibrating frequency markers in response to predetermined frequencies of said oscillator, a display having a frequency coordinate and an amplitude coordinate, means for synchronizing the frequency coordinate of said display with the frequency variation of said oscillator, and means for selectively coupling said signal of random amplitude or said frequency markers to the amplitude coordinate of said display.

11. A system for testing the frequency response of an equipment comprising a display having an orthogonal coordinate system of frequency versus signal amplitude, a variable frequency generator of constant amplitude oscillations, means for periodically sweeping the frequency of said generator and the frequency co-ordinate of said display in synchronism, means for selectively calibrating the frequency of said generator including; means for coupling said oscillations to the amplitude co-ordinate of said display, said last named means including filter means for providing a predetermined amplitude input to the amplitude co-ordinate at a predetermined frequency of the oscillations, and means for at will varying the frequency of said oscillator to said predetermined frequency; means for selectively coupling the constant amplitude oscillations to said equipment, and means for selectively coupling an output from said equipment to the amplitude co-ordinate of said display.

12. A system for testing the frequency response of an equipment comprising a display having an orthogonal coordinate system of frequency versus signal amplitude, a variable frequency generator of constant amplitude oscillations, means for periodically sweeping the frequency of said generator and frequency co-ordinate of said display in synchronism, means for selectively calibrating the frequency of said generator including; means for coupling said oscillations to the amplitude co-ordinate of said display, said last named means including filter means for providing a predetermined amplitude input to the amplitude co-ordinate at a predetermined frequency of the oscillations, the frequency positions of said oscillator and said time co-ordinate being adjustable relative to each other so that said predetermined amplitude input occurs on said frequency co-ordinate at said predetermined frequency; means for selectively coupling the constant amplitude oscillations to said equipment, and means for selectively coupling an output from said equipment to the amplitude co-ordinate of said display.

13. A system for testing the frequency response of an equipment comprising a display having an orthogonal co-ordinate system of frequency versus signal amplitude, a variable frequency generator of constant amplitude oscillations, means for periodically sweeping the frequency of said generator and the frequency co-ordinate of said display in synchronism, means for selectively calibrating the frequency of said generator including; means for coupling said oscillations to the amplitude co-ordinate of said display, said last named means including filter means for providing a null input to the amplitude co-ordinate at a predetermined frequency of the oscillations, the frequency positions of said oscillator and said frequency co-ordinate being adjustable relative to each other so that said null input occurs on said frequency co-ordinate at said predetermined frequency; means for selectively coupling the constant amplitude oscillations to said equipment, and means for selectively coupling an output from said equipment to the amplitude co-ordinate of said display.

14. A method for frequency calibrating a sweep frequency oscillator with a display having orthogonal amplitude and frequency co-ordinates, said frequency co-ordinate being synchronized with the frequency of said oscillator, comprising the steps of deriving as an input to said amplitude co-ordinate a null output from said oscillator at a predetermined frequency, and adjusting the frequency positions of said oscillator and said frequency co-ordinate so that said null amplitude occurs on said frequency co-ordinate at said predetermined frequency.

15. In a system for calibrating a frequency scanning oscillator, at the end frequencies and at an intermediate frequeny of scan of the frequency scanning signal derived therefrom, on the coordinate axes of the visual display of an oscilloscope, said axes including indicia, representing the amplitude of an input signal applied to said oscilloscope versus frequency of said signal taken as a function of the internal sweep of the oscilloscope, the combination comprising means for scanning the frequency of said oscillator to produce said frequency scanning signal, said means for scanning including means for adjusting the end frequency excursions of the scan of said frequency scanning signal, said oscillator including means for adjusting an intermediate frequency of said frequency scanning signal, means responsive to said frequency scanning signal for attenuating the amplitude thereof at predetermined precise frequencies of the scan corresponding to the desired intermediate and end frequencies thereof, means for applying the frequency scanning signal having said amplitude attenuated points to said oscilloscope to produce a graphic presentation thereof along the coordinate axes of said display, said last-named means including means responsive to a preselected frequency of said frequency scanning signal for triggering said internal sweep of said oscilloscope for synchronization thereof with the scanning of said oscillator, whereby said amplitude attenuated points of said frequency scanning signal in said graphic presentation may be displaced relative to said coordinate axis representing frequency, through adjustment of said means for adjusting said end frequencies and of said means for adjusting said intermediate frequency, to coincide with the indicia designating respective ones of said predetermined frequencies therealong for calibration of the scan of said frequency scanning signal.

16. The combination according to claim 15 wherein said means for triggering comprises resonant detection means for producing an energizing signal in response to a signal of said preselected frequency, and means responsive to said energizing signal for generating a trigger pulse to synchronize the sweep of said frequency coordinate axis of said display with the scanning of said oscillator.

References Cited by the Examiner

UNITED STATES PATENTS 2,767,376   10/1956   Winterbottom _____ 324—81
3,102,232   8/1963   Leonard et al. _____ 324—81 X

OTHER REFERENCES

"The Zeeman Effect in Microwave Molecular Spectra," article in the Physical Review, November 15, 1948, pp. 1396–1405.

WALTER L. CARLSON, Primary Examiner.

ADDISON E. RICHMOND, JR., EDWARD E. KUBASIEWICZ, Assistant Examiners.